United States Patent [19]

Gall

[11] 3,943,492

[45] Mar. 9, 1976

[54] PLURAL STORAGE SYSTEM

[75] Inventor: Richard C. Gall, Middleton, Wis.

[73] Assignee: Oak Industries Inc., Crystal Lake, Ill.

[22] Filed: Aug. 3, 1973

[21] Appl. No.: 385,307

Related U.S. Application Data

[63] Continuation-in-part of Ser. No. 281,334, Aug. 17, 1972, abandoned.

[52] U.S. Cl. .............................................. 340/172.5

[51] Int. Cl.$^2$ .............................................. G06F 3/00

[58] Field of Search ............. 178/69.5 R; 340/172.5, 340/347 DD; 179/15 BA, 15 BS

[56] References Cited

UNITED STATES PATENTS

| | | | |
|---|---|---|---|
| 3,588,883 | 6/1971 | Anderson et al. | 340/347 DD |
| 3,621,140 | 11/1971 | Griffiths | 178/69.5 R |
| 3,629,503 | 12/1971 | Rempert | 178/69.5 R |
| 3,786,415 | 1/1974 | Phillips et al. | 178/69.5 R X |
| 3,809,820 | 5/1974 | Sullivan | 179/15 BA |

*Primary Examiner*—Mark E. Nusbaum
*Attorney, Agent, or Firm*—Kinzer, Plyer, Dorn & McEachran

[57] ABSTRACT

A system for conveying information from a plurality of subscribers to a central station includes a communications link between each subscriber and the central station. At each subscriber there are means for transmitting coded information and means for controlling the time of transmission so that each subscriber repetitively provides information to the central station. The central station includes storage means for comparing successive signals from each subscriber and means for comparing the stored signals to verify their authenticity.

2 Claims, 2 Drawing Figures

PLURAL STORAGE SYSTEM

This application is a continuation-in-part of my copending application Ser. No. 281,334 filed Aug. 17, 1972, now abandoned.

SUMMARY OF THE INVENTION

The present invention relates to a system for conveying information from a series of subscribers to a central station and has application in the cable television field and in the security field.

A primary purpose of the invention is a communication system of the type described in which each of the subscribers repetitively sends coded information to the central station.

Another purpose is a communication system of the type described including means for verifying the authenticity of the received signals.

Another purpose is a communication system of the type described including means for recording a multibit message having a predetermined number of bits in which the message length may vary within prescribed limits.

Another purpose is a method of storing received multibit messages in which the length of the message may vary within prescribed limits, but the number of message bits is fixed.

Another purpose is a communication system of the type described including means for storing received signals at a central station and for comparing sequentially received signals from a particular subscriber to verify the authenticity thereof.

Other purposes will appear in the ensuing specification, drawings and claims.

BRIEF DESCRIPTION OF THE DRAWINGS

The invention is illustrated diagrammatically in the following drawings wherein.

DESCRIPTION OF THE PREFERRED EMBODIMENT

The present invention has application in the field of cable television, as well as in the field of security systems. In each field of application it is desirable to send information from a series of satellite stations back to a central station. In the area of cable television, or pay television, such information is necessary for billing purposes as well as for audience surveys, etc. In the security field it is desirable to continuously monitor various sensing systems at remote locations, either in a home or place of business. In many instances, particularly in home use, a cable system may combine the transmission of cable television signals, means for monitoring the received cable programming and means for monitoring a security system. The present invention provides a system for sending coded information from the subscriber back to the central station, which coded information can contain information from a number of different sensors at the subscriber. Such sensors may be involved in the security of the home or place of business and may also provide information as to the received programming, audience surveys, etc.

Most present-day communication systems of the type described are two-way systems in that the satellite stations or subscribers are periodically interrogated to provide coded responses. The disadvantage of such two-way systems is that each subscriber location must have receiving equipment as well as transmitting equipment, thus substantially increasing the cost. A major disadvantage of prior one-way systems, in which there was no interrogating signal from the central station, was that there was no way of testing the transmitting equipment at the satellite station to make sure that it was in operable condition. The present invention provides a communication system of the type described at substantially reduced cost in that it is a one-way system and yet provides for system integrity in that the continuously-received repetitive signals from the subscriber stations provide a constant monitor of the condition of the transmitting equipment at each subscriber.

Figure 1:
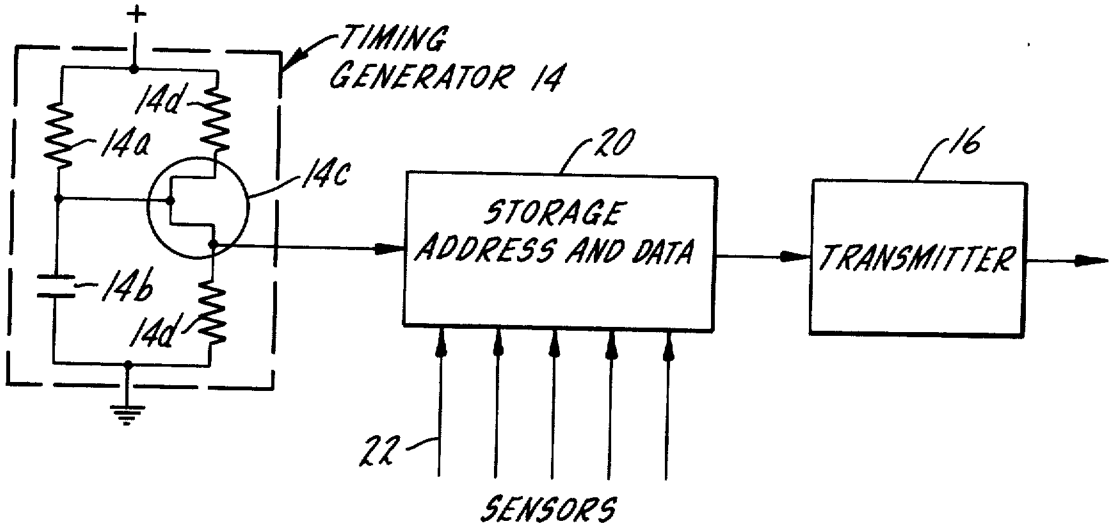
FIG. 1 is a diagrammatic illustration of a typical subscriber location.
Figure 2:
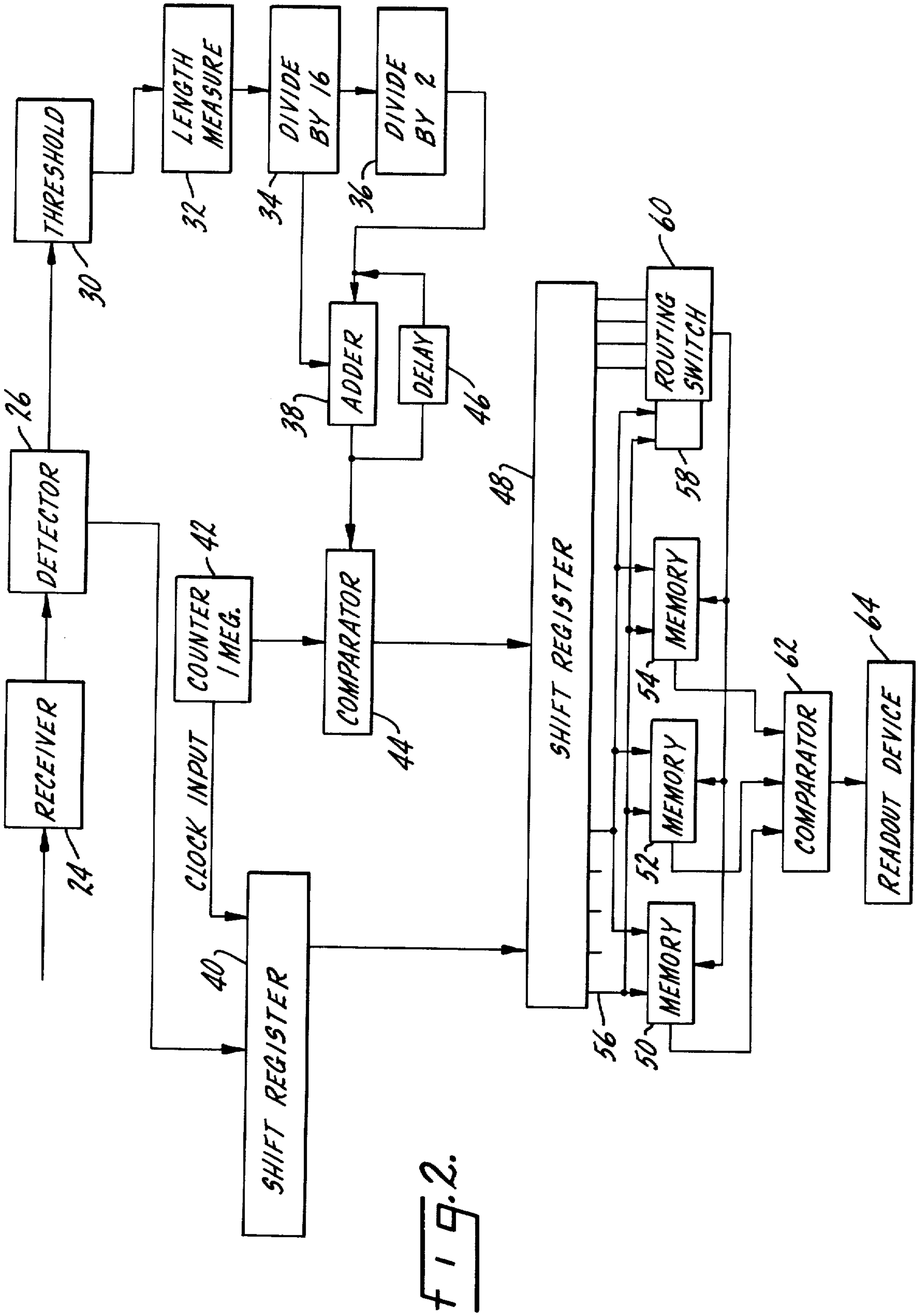
FIG. 2 is a block diagram of the central station.

The central station is indicated in FIG. 2 and a typical subscriber station is indicated in FIG. 1. A cable or other type of communication link may typically connect all of the subscriber or satellite stations with the central station. Such a communication link may be leased telephone lines, radio relay or other types of on-air transmission mediums.

At each of the subscriber locations there is a transmitter 16 and a timing generator 14. In addition, there is signal storage means indicated at 20 which may receive information from any one of a plurality of sensors, the lines for which are indicated at 22. The storage means may typically be a Motorola MC 7495 which, on receiving a start signal from the timing generator 14, will send a series of pulses to the transmitter 16 for use in modulating a carrier signal. The pulses include both an address for the particular subscriber location and data indicating the condition of the various sensors.

The timing generator 14 includes an RC timing circuit made up of a resistor **14*a* and a condenser 14*b* connected to a unijunction transistor 14*c*, with the output from the unijunction transistor providing the start signal to read out the information in the storage means 20. Resistors 14*d* may be connected on opposite sides of the unijunction transistor 14*c*.**

The information provided at the storage means 20 may be the status of a burglar alarm, the status of fire detection equipment, and/or the particular channel a television set is tuned to. The storage means 20 will provide coded electrical signals for the transmitter 16, in the form of information pulses or bits which will include and address indicative of the location of the particular subscriber station. In some applications an address may not be necessary, for example in audience survey work the number of stations tuned to a particular channel is more important than which subscribers are tuned to that channel. Thus, the information provided to the transmitter includes the status of a number of sensors and it may or may not include the address of a particular subscriber location. The timing generator 14 will enable the transmitter 16 to transmit coded information at periodic intervals. The time between intervals will not be rigidly fixed, but may vary as much as 10 or 20 percent, depending upon the tolerances of the RC timing circuit. It is preferred that the components in the timing circuit have rather wide tolerances so that there will be a variation in the timed relationship of the output pulses from the timing generator.

By having the length of the coded message substantially smaller than the time period between messages, there is little likelihood of overlap in the signals received at the central station from different subscriber locations. However, as there is a possibility of such overlap, verifying and decoding means are provided at the central station which eliminate all but those signals which are authentic.

At the central station, all signals from the subscriber locations are received by a receiver 24. The receiver signals are detected in a detector 26 which removes the modulation from the address and information bits of the signal. There are two outputs from the detector 26. One output goes through a threshold circuit 30 which determines whether or not the received signal is noise or in fact a true information signal. Both the detector 26 and threshold circuit 30 are disclosed in "Active Networks" by Vincent C. Rideout, Sixth Printing, June 1960, Library of Congress No. 54-8157.

The received signal, which is a series of uniformly spaced bits, may vary in total time, as an example, from 128 to 192 microseconds. There is such a variation in the duration of the received message because the transmitter at each subscriber location will not have rigid frequency control. Instead, the equipment at each subscriber location will be relatively inexpensive and thus the message transmission time, or the frequency of transmission, may vary. Hence, the variation in the length of time of a 16-bit received message may be, as indicated above, from 128 to 192 microseconds.

Connected to the threshold circuit 30 is a length measuring circuit 32, typically a Motorola MC 54934, which will measure the actual time duration of the received message. The actual time of the message is divided by 16, the number of bits in the message, by a divide circuit 34. The output from the divide circuit 34, the actual time of the message divided by 16, will be divided by 2 in a divide circuit 36. An adder circuit, typically a Motorola MC 54834, is indicated at 38 and receives an input both from the divide-by-16 circuit 34 and the divide-by-2 circuit 36. Thus, the adder 38 has one input which is the total time of the message divided by 16 and another input which is the total time of the message divided by 32.

The second output from the detector 26 goes to a shift register 40, typically a Motorala MC 5495, which stores the information in the message, received in serial form. A one megacycle counter is indicated at 42 and provides the clock input for the shift register 40. Thus, the shift register 40 will store a bit every microsecond for 192 microseconds, which is the maximum total length of the received message. Even though the message may be shorter than 192 microseconds, the shift register 40 will be clocked 192 times. The detector output for a no signal input condition will be stored in the extra shift register positions and later disregarded.

A second output from the one megacycle counter 42 goes to a comparator circuit 44 which also is connected to the adder 38. The comparator circuit will compare the state (i.e., the binary number held at that time ) of the 1 megacycle counter 42 with the output of adder 38. Beginning with the counter 42 at zero, the adder output will be a binary number which is the total time of the message divided by 32. When the counter output advances to the same state as the adder output, the comparator will give an output allowing the 16-bit shift register 48 typically a Motorola MC 5495, to advance one position. The adder circuitry then computes the number to correspond to the center of the next bit by adding one-sixteenth of the total message time to the one thirty-second just used. Delay 46 prevents the adder output from immediately appearing at its input, thus permitting the adder to function limited only by its interval delays. This process continues until 31/32 of the total message time has passed. It should be understood, of course, that the above example only applies to a message having 16 bits.

Whenever the comparator receives a clock pulse from the one megacycle counter, and a pulse from the adder 38, it then provides a clock signal for transfering the message, in serial form, from shift register 40 to a second shift register 48. Thus, stored in shift register 48, in parallel form, are the 16 message bits which were originally received by the receiver 24.

Three different memory circuits, typically Texas Instruments TMS 11015c, indicated at 50, 52 and 54, are each connected to all of the address ouputs 56 of shift register 48. Also connected to the address outputs of shift register 48 is a count memory 58 which is a part of a routing switch 60. The routing switch 60 is connected to the information data outputs of shift register 48 and may typically be a Motorola MC 4048. The routing switch 60 has its output connected to each of the memory circuits 50, 52 and 54. The output of each of the memory circuits 50, 52 and 54 are connected to a comparator 62, which may typically be a Motorola MC 4022. The comparator 62 may have its output connected to a suitable readout device indicated at 64.

The above-described circuit comprising the memories, routing switch and comparator, is effective to verify the authenticity of a received message. Each time a message is received and stored in shift register 48, each of memories 50, 52 and 54 and count memory 58 will shift to the prescribed address of the received message. The data information will go to the routing switch 60. Count memory 58 controls routing switch 60 so that successive messages having the same address are stored sequentially in memories 50, 52 and 54. The first message for a particular address will be routed by switch 60, controlled by count memory 58, to memory 50. The next time a message is received from that address, it will be routed to memory 52 and the third time to memory 54. In each case the information or data from the message is stored in the memory for that particular address. When all three memories have a message stored for that particular address, the comparator 62 will compare the three stored messages and if they are identical, it will pass this message to the readout device 64.

Thus, the messages provided by each subscriber are repetitively sent without a timed relationship between subscribers. Because each message can be of short duration compared to its repetition period and the total time consumed by messages from all subscribers can be made small compared to the total available time in an average system cycle, the likelihood of overlap of two or more messages can be made as small as desired. However, any message overlap will be eliminated by the verification procedures. Once a message has been appropriately stored in the shift register 48, then the message is verified. Verification is accomplished by comparing three successive messages from the same subscriber. Since the messages will be coming a few seconds apart from the same subscriber, the chances for a variation in the condition of any one sensor at a subscriber are minute. Assuming all three messages are the same, the authenticity of the information in the message will have been verified and will be fed by the comparator to the readout device.

Whereas the particular method and apparatus for recording or registering a message of varying time duration, but having a fixed number of uniformly spaced bits, has been described in connection with a particular communication system, it should be realized that this particular aspect of the overall circuit has wider application. The present method may be utilized in any environment in which it is desired to record a message of varying length in which the message has a fixed number of bits.

The particular number of bits in the message, and the length of message described above, are merely for purposes of illustration.

Whereas the preferred form of the invention has been shown and described herein, it should be realized that there may be many modifications, substitutions and alterations thereto.

The embodiments of the invention in which an exclusive property or privelege is claimed are defined as follows:

1. A method for storing a multibit message having a predetermined number of bits in which the total time of the message may vary within prescribed limits includng the steps of:

1. storing the presence or absence of message bits in a storage medium at intervals determined by a fixed clock frequency,
2. measuring the total time of the received message,
3. dividing the total time of the message by the predetermined number of bits to provide periodic clock signals,
4. transferring the message from the first storage medium to a second storage medium at a frequency determined by coincidence between said fixed clock frequency signals and periodic clock signals.

2. A system for storing a multibit message having a predetermined number of bits in which the total time of the message may vary within prescribed limits, including a first storage medium, first clock means connected to said first storage medium for providing a fixed clock frequency for causing the presence or absence of message bits to be stored in said first storage medium, a second storage medium connected to said first storage medium, means for determining a second clock frequency for said second storage medium including means for dividing the duration of the transmitted message by said predetermined number of bits, means for comparing pulses from said dividing means with pulses from the first clock means, said comparison means being connected to said second storage medium for providing clock pulses at equivalence of said dividing means pulses and first clock means pulses for enabling the transmission of the message bits from the first storage medium to the second storage medium.

* * * * *